United States Patent [19]
Joerg et al.

[11] Patent Number: 5,651,424
[45] Date of Patent: Jul. 29, 1997

[54] SERVO-ASSISTED RACK-AND-PINION STEERING SYSTEM

[75] Inventors: Wolgang Joerg, Stuttgart; Jaromir Bordovsky, Berglen; Aydogan Cakmaz, Stuttgart; Hubert Heck, Duesseldorf; Arno Roehringer, Ditzingen; Claus Gall, Fellbach; Reinhold Abt, Neuhausen; Rainer Strauss, Kaarst; Karl-Hans Koehler, Wernau, all of Germany

[73] Assignee: Mercedes-Benz AG, Stuttgart, Germany

[21] Appl. No.: 495,991

[22] Filed: Jun. 28, 1995

[30] Foreign Application Priority Data

Jun. 28, 1994 [DE] Germany .................. 44 22 560.1

[51] Int. Cl.⁶ .................................................. B62D 5/22
[52] U.S. Cl. ............................ 180/428; 180/427; 180/442
[58] Field of Search ........................ 180/417, 426, 180/427, 428, 431, 434, 441, 442; 74/388 PS, 422; 91/401, 368, 375 A; 92/136

[56] References Cited

U.S. PATENT DOCUMENTS

| 4,607,717 | 8/1986 | Nakayama | 180/436 X |
| 4,627,510 | 12/1986 | Camus | 180/428 |
| 4,779,694 | 10/1988 | Adams | 180/428 |
| 5,509,493 | 4/1996 | Lang et al. | 180/428 X |
| 5,529,137 | 6/1996 | Lang | 180/428 X |

FOREIGN PATENT DOCUMENTS

| 40 36 743 | 5/1992 | Germany . |
| 42 03 335 | 8/1993 | Germany . |

*Primary Examiner*—Brian L. Johnson
*Assistant Examiner*—Victor E. Johnson
*Attorney, Agent, or Firm*—Evenson, McKeown, Edwards & Lenahan, P.L.L.C.

[57] ABSTRACT

A servo-assisted rack-and-pinion steering system includes a rack which cooperates with a pinion which is capable of limited movement transversely or, in particular, parallel to the longitudinal axis of the rack. The movements actuate the servomotor or its control elements.

8 Claims, 1 Drawing Sheet

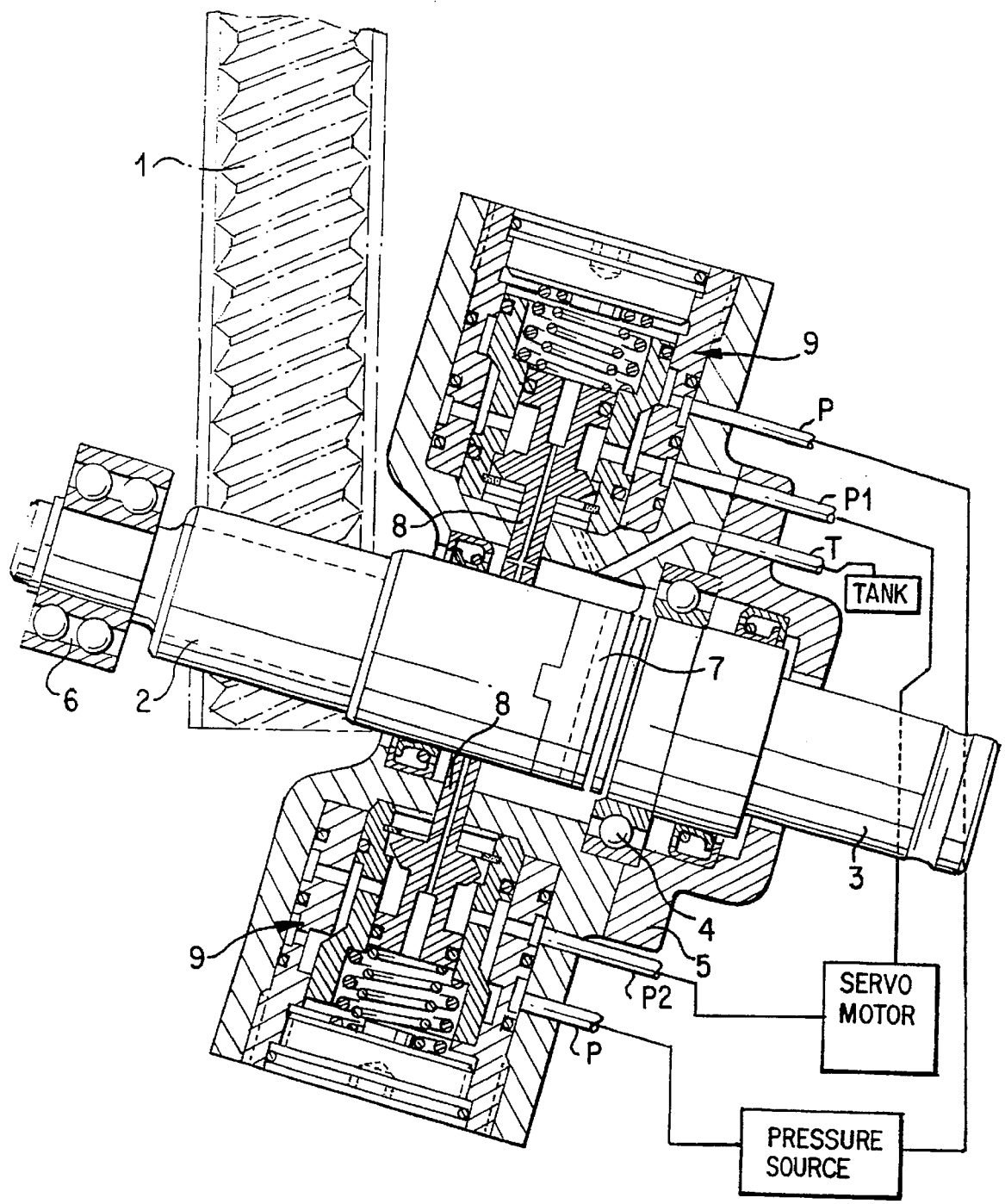

SERVO-ASSISTED RACK-AND-PINION STEERING SYSTEM

BACKGROUND AND SUMMARY OF THE INVENTION

The invention relates to a servo-assisted rack-and-pinion steering system in which the rack cooperates with a pinion. The pinion is capable of limited movement transversely or, in particular, parallel to the longitudinal axis of the rack. The movements of the pinion, which occur through constraint when forces are transmitted between the pinion and the rack, actuate the servomotor or its control elements.

A corresponding servo steering system is known, for example, from German Patent document DE 42 03 335 A1. There, the pinion is fastened in a fixed bearing at its axial end which is to be connected to the steering wheel, while the other axial end of the pinion is mounted in a movable bearing. On the transmission of forces between the pinion and the rack, the pinion axis is accordingly constrained to make swivelling movements. These swivelling movements are transmitted via parts of the movable bearing to push rods of a servo valve arrangement, by which a hydraulic servomotor is controlled.

In a rack-and-pinion steering system of the type described above known from German Patent document DE 40 36 743 A1, the pinion is mounted axially and radially in a sleeve. The sleeve is provided in the region of the rack with a window enabling the pinion to engage in the rack. The sleeve is fastened for swivelling about an axis which is parallel to the pinion axis and is situated on that side of the plane of the rack toothing which is remote from the pinion axis. When forces are transmitted between the pinion and the rack, the sleeve then makes swivelling movements together with the pinion. This has the consequence that the pinion axis is displaced sideways in one direction or the other, relative to a normal position, parallel to the longitudinal axis of the rack. Through a lever-like radial extension arranged on the sleeve, this swivelling movement is transmitted to the valve slide of a servo valve arrangement in order to control a hydraulic servomotor.

In these known designs, it is not possible to preclude the undesired occurrence of pinion movements which act on the servomotor.

There is therefore needed a steering system design of the type described above which, kinematically, is markedly improved.

According to the present invention, this need is met in that the pinion is connected to a shaft part, connected to it, through a coupling permitting misalignment of axes, for example, according to the "Oldham" system.

The invention is based on the general principle of suppressing the ability of a steering system to transmit radial forces between the pinion and the steering shaft or the like, which is to be connected to it for driving purposes, so that substantially only torques can be transmitted.

A high degree of design freedom with respect to the installation and construction of the steering shaft, or of the parts to be connected to the pinion for the driving connection to the steering wheel, is thus achieved. In particular, these parts can have comparatively resilient mountings.

At the axial end remote from the coupling, the pinion is preferably mounted using a self-aligning bearing, so that the pinion axis can oscillate about the center of this bearing.

A part arranged axially between the coupling and the toothing part of the pinion can directly actuate a servo valve arrangement, for example, using push rods which are arranged to be slidable, against spring force, by means of the aforesaid part of the pinion.

If the servomotor works hydraulically, as is usually expedient, the return flow of the hydraulic medium to a reservoir or tank is made to pass through a casing part, embracing the coupling, of the rack-and-pinion steering system. This is done so that the coupling permitting axis misalignment between the pinion and the shaft part is continuously force-fed with lubricant and remains easy-running.

In this case, the return flow can pass through axial channels in the aforesaid push rods.

Other objects, advantages and novel features of the present invention will become apparent from the following detailed description of the invention when considered in conjunction with the accompanying drawings.

BRIEF DESCRIPTION OF THE DRAWING

The single figure of the drawing shows a sectional plan view of a rack-and-pinion steering system according to the present invention, the sectional plane lying parallel to the rack and containing the pinion axis.

DETAILED DESCRIPTION OF THE DRAWING

In accordance with the drawing, a rack 1 is provided. The rack 1 is connected in a basically known manner to a steering linkage, for example track rods (not shown), for the purpose of steering the steered wheels of a motor vehicle. The rack 1 cooperates with a pinion 2, which in turn is connected for driving purposes to a steering wheel (not shown) of a motor vehicle.

For this purpose, the pinion 2 is connected to and rotatable with a shaft part 3. The shaft part 3 in turn can then be connected to a steering shaft (not shown) or the like. The shaft part 3 is mounted axially and radially by means of a grooved ball bearing 4 in a casing 5 of the rack-and-pinion steering system.

At its axial end remote from the shaft part 3, the pinion 2 is mounted in a self-aligning bearing 6, so that the pinion axis is able to make oscillating movements in relation to the center of the bearing. The other axial end of the pinion 2 is connected to the shaft part 3, for rotation with the latter, by means of a coupling 7 permitting misalignment of axes, for example according to the "Oldham" system.

Between the toothed region cooperating with the rack 1 of the pinion 2 and the coupling 7, the pinion 2 has a portion having a smooth circumferential wall of circular cross-section. Push rods 8 of valve cartridges 9, which are accommodated in corresponding casing bores in a "boxer" arrangement on each side of the pinion 2, lie against the smooth circumferential walled portion.

When forces are transmitted between the rack 1 and the pinion 2, the pinion 2 makes oscillating movements about the center of the self-aligning bearing 6. The direction of the movements depends on the direction of the forces transmitted between the rack 1 and the pinion 2. Either one or other of the push rods 8 is accordingly actuated.

This has the consequence that in each case one of the connections P1 and P2 of a servomotor is connected to one of the connections P for a hydraulic pressure source, while the respective other motor connection P1 or P2 remains in communication with a connection T of a reservoir or tank The servomotor can thus produce a force assisting the steering movement in question.

In the central position of the pinion 2, both push rods 8 assume the position shown in the drawing, in which both motor connections P1 and p2 are connected to the tank connection T, while the pressure connections P are closed.

The valve cartridges 9 are arranged in such a manner that, on operation of the servomotor, the hydraulic medium flowing back from the servomotor flows to the tank connection T via one of the axial bores in the push rods 8 through an annular chamber which is formed in the casing 5 and which embraces the coupling 7 and encloses part of the pinion 2. In this manner, the coupling 7 is force-fed with hydraulic oil as a lubricant.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A servo-assisted rack-and-pinion steering system, comprising:
   a pinion having an axis;
   a rack cooperating with said pinion, said pinion being capable of limited transverse movement;
   a servomotor having control elements operatively coupled to the pinion;
   wherein the limited transverse movement, which occurs due to constraint forces transmitted between the pinion and the rack, actuates the servomotor;
   a shaft part, having an axis, operably connected to the pinion for driving purposes; and
   a coupling arranged between said shaft part and said pinion for permitting a misalignment of the pinion axis and the shaft part axis.

2. A servo-assisted rack-and-pinion steering system according to claim 1, wherein said coupling for permitting misalignment of the axes of said pinion and said shaft part is an Oldham coupling.

3. A servo-assisted rack-and-pinion steering system according to claim 1, further comprising self-aligning bearing in which the pinion is mounted at an axial end remote from said coupling.

4. A servo-assisted rack-and-pinion steering system, comprising:
   a pinion having an axis;
   a rack cooperating with said pinion, said pinion being capable of limited transverse movement;
   a servomotor having control elements operatively coupled to the pinion;
   wherein the limited transverse movement, which occurs due to constraint forces transmitted between the pinion and the rack, actuates the servomotor;
   a shaft part, having an axis, operably connected to the pinion for driving purposes;
   a coupling arranged between said shaft part and said pinion for permitting a misalignment of the pinion axis and the shaft part axis; and
   a servo valve arrangement, said servo valve arrangement being actuated via a part of said pinion arranged axially between said coupling and a toothing part of said pinion.

5. A servo-assisted rack-and-pinion steering system according to claim 1, further comprising:
   a casing mounted on the rack-and-pinion steering system;
   wherein said shaft part is mounted axially and radially on the casing.

6. A servo-assisted rack-and-pinion steering system according to claim 5, wherein said shaft part is mounted axially and radially on said casing via a grooved ball bearing.

7. A servo-assisted rack-and-pinion steering system, comprising:
   a pinion having an axis;
   a rack cooperating with said pinion, said pinion being capable of limited transverse movement;
   a servomotor having control elements operatively coupled to the pinion;
   wherein the limited transverse movement, which occurs due to constraint forces transmitted between the pinion and the rack, actuates the servomotor;
   a shaft part, having an axis, operably connected to the pinion for driving purposes;
   a coupling arranged between said shaft part and said pinion for permitting a misalignment of the pinion axis and the shaft part axis; and
   wherein said servomotor is a hydraulic servomotor and further wherein said coupling lies in a path of a hydraulic medium for said hydraulic servomotor.

8. A servo assisted rack-and-pinion steering system according to claim 1, wherein said limited transverse movement defines an arc having a tangent substantially parallel to a longitudinal axis of the rack.

* * * * *